Nov. 13, 1923.
H. G. EYRE ET AL
1,473,956
ATTACHMENT FOR MOTOR CYCLES
Filed June 21, 1922
4 Sheets-Sheet 2
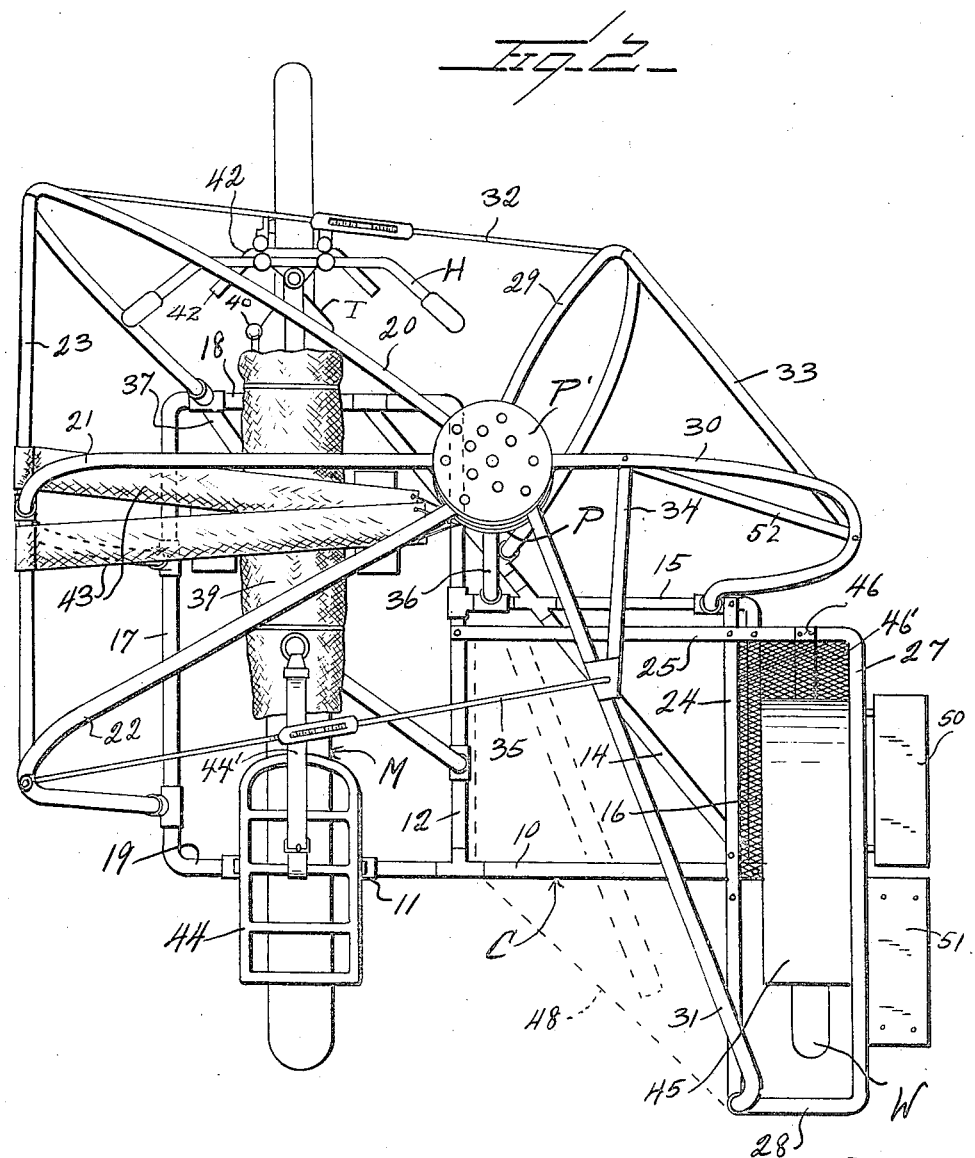
Inventors
H. G. Eyre
& C. H. Crites
By Watson E. Coleman
Attorney

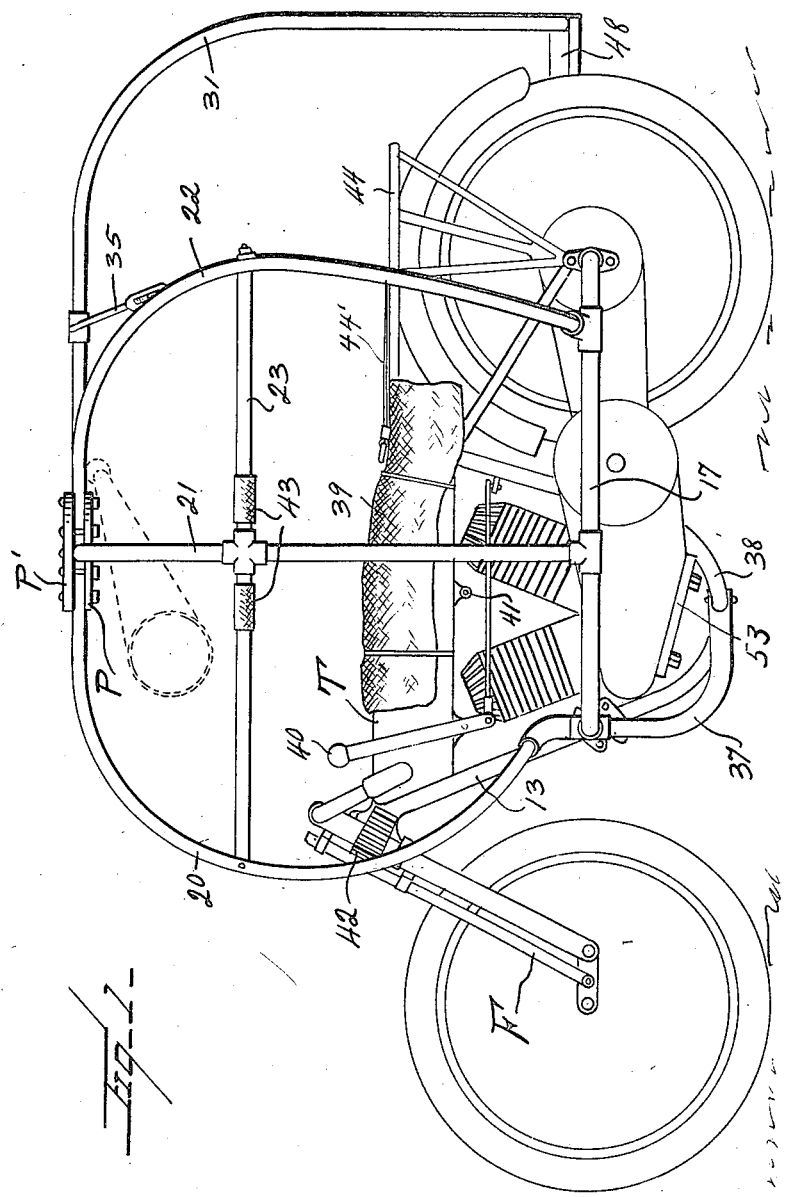

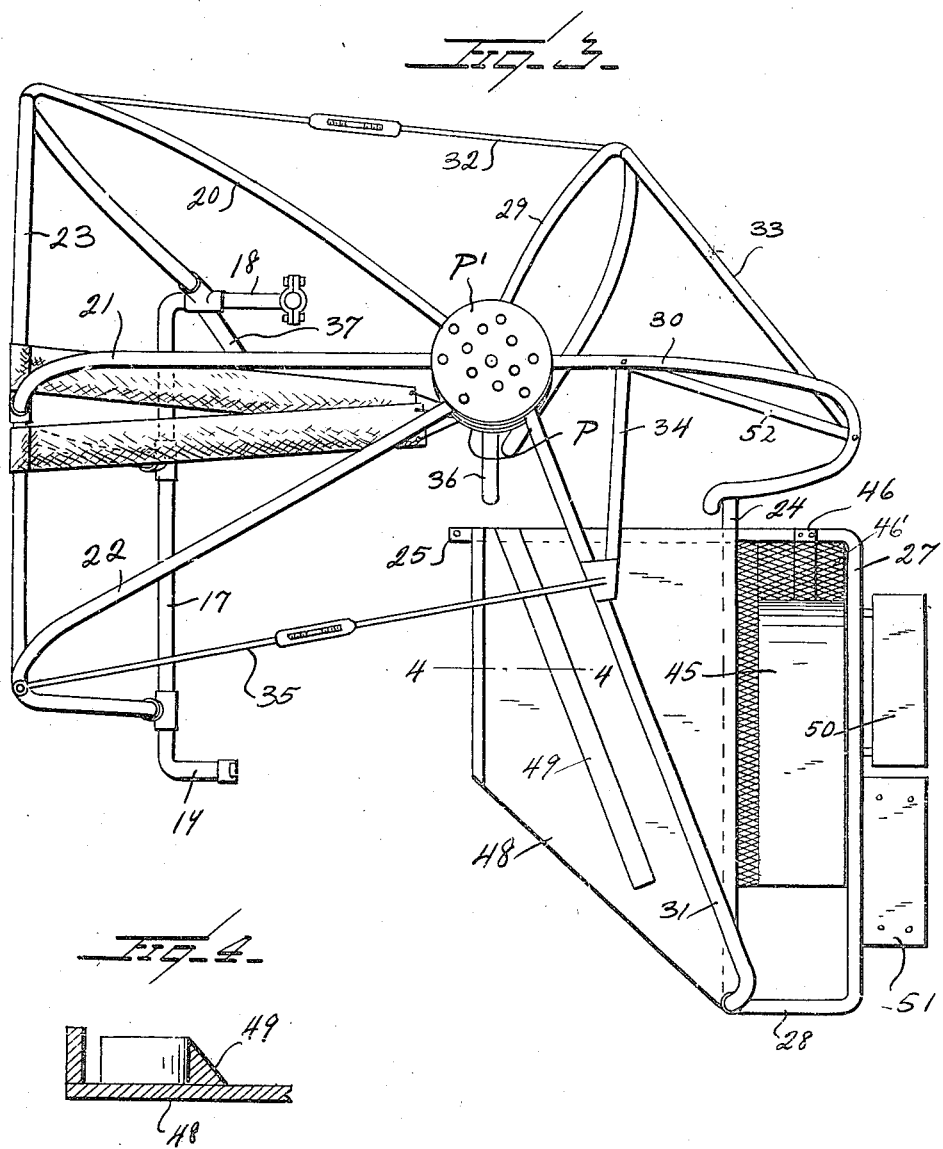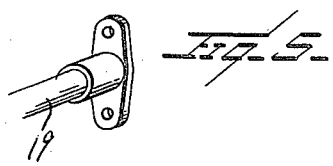

Nov. 13, 1923. 1,473,956
H. G. EYRE ET AL
ATTACHMENT FOR MOTOR CYCLES
Filed June 21, 1922    4 Sheets-Sheet 4

Inventor
H G EYRE
C. H. CRITES
By Watson E. Coleman
Attorney

Patented Nov. 13, 1923.

1,473,956

UNITED STATES PATENT OFFICE.

HARRY G. EYRE AND CLEO H. CRITES, OF TOPEKA, KANSAS.

ATTACHMENT FOR MOTOR CYCLES.

Application filed June 21, 1922. Serial No. 569,825.

*To all whom it may concern:*

Be it known that we, HARRY G. EYRE and CLEO H. CRITES, citizens of the United States, residing at Topeka, in the county of Shawnee and State of Kansas, have invented certain new and useful Improvements in Attachments for Motor Cycles, of which the following is a specification, reference being had to the accompanying drawings.

This invention relates to attachments for motorcycles, and more particularly to an attachment for a motorcycle whereby the same may be employed for playing polo.

An important object of the invention is to provide a device of this character which will fully protect the rider of the motorcycle against possible injury when the motorcycle is upset in turning or due to collision or the like.

A further object of the invention is to provide a device of this character which may be readily attached to and detached from a motorcycle.

A still further object of the invention is to provide means whereby the motorcycle rider is held upon his seat in the event of overturning or a collision of the motorcycle.

Another object of the invention is to provide a device of this character which may be applied to a motorcycle without materially altering the construction thereof.

An additional object of the invention is to provide a device of this character which is simple in its construction, durable in service and a general improvement in the art.

These and other objects we attain by the construction and arrangement shown in the accompanying drawings wherein for the purpose of illustration is shown a preferred embodiment of our invention and wherein like reference characters designate like parts throughout.

In the drawings:—

Figure 1 is a side elevation of a motorcycle having an attachment constructed in accordance with our invention;

Figure 2 is a plan thereof;

Figure 3 is a similar view of the attachment removed from the motorcycle;

Figure 4 is a section on the line 4—4 of Figure 3;

Figure 5 is a detail perspective view showing the mountings of the ends of the support.

Figures 6, 7, 8:
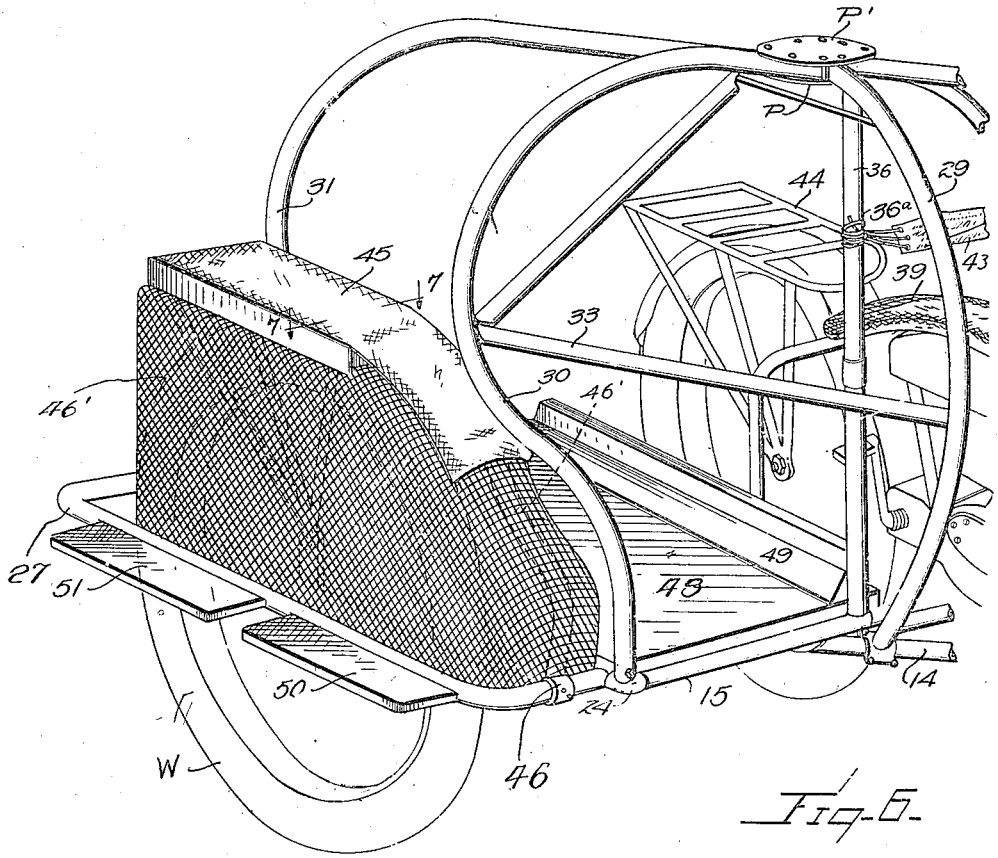
Figure 6 is a fragmentary perspective of the machine taken from the right-hand side thereof and illustrating particularly the parts associated with the side car chassis.
Figure 7 is a fragmentary sectional view taken on the line 7—7 of Figure 6.
Figure 8 is a detail sectional view showing the mounting of the foldable foot board 50.

Referring now more particularly to the drawings, the character M designates a motorcycle as a whole, which is illustrated in the present instance as having secured thereto a side car chassis C. This side car chassis, as well known to those familiar with the art, consists of an axle 10 secured at one end, as at 11, to the rear end of the motorcycle frame at one side of the drive wheel of the motorcycle. From the axle 10, which is provided at its outer end with a supporting wheel W, a brace 12 extends forwardly in substantially parallel relation to the motorcycle M and has its forward end turned toward the motorcycle and secured to the forward brace 13 of the engine support of the motorcycle. To the inturned end of the brace 12 is secured a second rearwardly extending brace 14 which inclines outwardly from the motorcycle and has its rear end secured to the axle 10 adjacent the wheel bearing end thereof. The numeral 15 indicates a spring bracket of the chassis C which is secured to the braces 12 and 14 and extends outwardly from these braces and is provided at its outer end with a rearwardly extending brace 16, the rear end of which is secured to the wheel bearing end of the axle 10. The parts 10 to 16 inclusive constitute a motorcycle side car chassis of usual construction and form no part of our invention but are employed for supporting the protecting cage, as will hereinafter appear.

The numeral 17 indicates a bar paralleling the motorcycle M at the opposite side thereof from the chassis C and having its forward end 18 turned inwardly and engaged with the brace 13 in substantially the same manner as this brace is engaged by the brace 12 of the chassis C. The rear end 19 of the bar 17 is likewise turned inwardly and is engaged with the rear end of the motorcycle frame in substantially the same manner as the axle 10 is attached thereto but at the opposite side of the drive wheel therefrom. The numerals 20, 21 and 22 designate arcuately curved diverging brace bars having their upper ends secured to a plate P in any suitable manner and their lower ends engaged with the bar 17, the braces 20 and 22 being engaged with the bar 17 adjacent the forward and rear ends thereof and the brace 21 being engaged with the bar 17 approximately centrally thereof. The central or belly portions of the brace bars 20, 21 and 22 are connected by bracing and spacing elements 23.

Secured to the spring support 15 adjacent the outer end thereof and extending rearwardly and over the axle 10 is a support 24, the rear end of which is disposed rearwardly of the rear end of the wheel W of the chassis C. Secured to the brace 12 of the chassis and to the support bar 24 in advance of the wheel W is a transverse support bar 25, the outer end of which projects beyond the outer face of the wheel W and has secured thereto a rearwardly extending supporting member 27, the rear end 28 of which turns inwardly and is secured to the rear end of the bar 24. It will be seen that the support 24, the outer end of the support 25 and the support 27 combine to form a framework surrounding the wheel W. The numerals 29, 30 and 31 indicate arcuately curved brace bars corresponding to the brace bars 20, 21 and 22 but extending to the opposite side of the motorcycle M therefrom. The lower end of the forward right hand brace bar 29 is secured to the angular brace 14 of the chassis C and the belly portion of this brace bar is connected with the belly portion of the forward brace bar 20 at the left hand side of the machine by a brace rod 32 which is adjustable as to length. The central brace bar 30 which is substantially aligned with the brace bar 21 of the left hand side of the cage has its lower end secured to the spring bracket 15 adjacent the outer end thereof and is connected at its belly portion with the belly portion of the brace 29 by means of a rigid spacing and connecting bar 33. The rear right hand brace bar has its lower end secured to the end 28 of the support 27 at the junction thereof with the brace 24 and is secured at its upper portion at a point near the plate P to a corresponding point on the brace 30 by a forwardly extending brace 34. The rear right and left hand braces 22 and 31 of the cage are connected by a spacing and bracing bar 35 which is adjustable as to length.

The plate P is rigidly connected with the chassis C by means of a vertically extending brace 36, the lower end of the brace being engaged with the spring bracket or support 15 adjacent the inner end thereof and between the braces 12 and 14 of the chassis so that a very rigid support is provided. The upper ends of the braces are held in position upon the plate P by means of a second plate P¹ superposed thereon and secured to the plate P and braces 20, 21, 22, 29, 30 and 31 by means of bolts or the like. Secured to the forward end 18 of the bar 17 and extending first downwardly and then inwardly and rearwardly therefrom is a guard 37, the end of which is engaged with the lower engine support member 38 of the motorcycle frame.

The main changes in the construction of the motorcycle proper consist in the removal of the seat thereof and the provision of a shock absorbing pad 39 secured upon the tank T of the motorcycle and upon which the rider of the motorcycle is adapted to rest, and with the shifting of the gear shift lever 40 from its accustomed supporting bracket 41 to a point further forwardly upon the tank in order that it may be more readily accessible to the driver when resting upon the pad 39. We likewise provide the front fork F of the motorcycle with guard strips 42 adapted to engage the tank T of the motorcycle M prior to the engagement of the operator's hands when in position upon the handle bars H with the tank so as to prevent mashing of the fingers during an upset of the cycle or a sharp turn, it being understood that when the operator is lying upon the pad 39 the handle bars H must necessarily be positioned forwardly well down as they are usually mounted in racing. Secured to the post or standard 36 at one end as indicated at 36ᵃ and to the braces 23 at the opposite end are canvas strips 43 which, when the driver is in position upon the pad 39, will extend immediately over his back and effectually prevent him from being thrown against the brace bars of the cage when the motorcycle is upset. As an additional precaution for the safety of the driver, we secure to a rigid portion at the rear end of the motorcycle M and preferably to an ordinary luggage carrier 44, one end of a safety strap 44', the opposite end of which is adapted for engagement with a belt worn by the driver and which will prevent the driver being thrown forwardlly upon the pad.

Suitably secured to the chassis C of the side car and to the brace 27 is a mallet man's seat 45 straddling the wheel W and connected with the outer end of the support 25 by means of a forwardly and downwardly extending arcuate brace 46. This seat 45 is adapted to be occupied by the man wielding the mallet in playing a game of polo and has extending downwardly therefrom and secured to the supports 25 and 27 wire netting 46' enclosing the upper portion of the wheel W so that his legs may be protected from accidental engagement therewith. Arranged upon the chassis C inwardly of the wheel W is a platform 48 which is provided with an angularly disposed foot rest 49 against which the inside foot of the mallet man may be engaged to prevent its slipping upon the platform. To the support 27 are secured a folding foot support 50 and a rigid plate 51 adapted to support the chassis C in event of a right hand turn over of the machine and prevent injury to the outer leg of the mallet man. The mallet man's seat, it will be noted, is arranged in an exposed position permitting him to jump from the machine in the event of overturn unless the overturn is very rapid and a right hand turn. In order that the mallet man may suitably brace himself, he may either engage his hand with the brace 34 connecting the arcuate braces 30 and 31 at the left hand side of the machine or with a transverse brace 52 connecting the belly portion of the brace 30 with the upper end portion thereof.

It will be seen that the structure hereinbefore described provides a cage substantially circular in cross section adapted to receive and substantially enclose a motorcycle and a side car frame attached to the motorcycle. It will also be seen that this frame embodies means for protecting the driver of the machine and maintaining him in position upon his seat. The brace 37 hereinbefore described effectually prevents the engagement of the foot board 53 at the left hand side of the machine with the ground and accordingly prevents this foot board from being folded up against the driver's foot. Means are further provided for preventing mashing of the driver's fingers and for providing for the easy escape of the mallet man from his seat in the event of an overturn. If the machine be overturned either to the right or the left, it will roll upon the arcuate braces and may be readily returned to its proper position if it does not do so automatically, the wheels of the motorcycle and the wheel W of the side car chassis providing a three point support which will ordinarily check the overturning movement, leaving the machine in the proper position upon the ground. In case of a forward overturn occurring when making a right hand turn, which is a common occurrence where a side car chassis is attached to a motorcycle, the force of the fall will be taken by the brace 30 and the machine may be readily righted.

From the foregoing it is believed to be obvious that an attachment constructed in accordance with our invention is particularly well adapted for the purpose for which it is intended for the reason that a complete protection for the driver is afforded and for the reason that it may be readily attached to or detached from the motorcycle when this is desired. It will furthermore be obvious that the construction thereof as hereinbefore set forth is capable of some change and modification without materially departing from the spirit of our invention and we accordingly do not limit ourselves thereto except as hereinafter claimed.

We claim:—

1. A motorcycle attachment for use in playing games comprising a protecting and shock receiving cage adapted to receive and substantially enclose the motorcycle, said cage being substantially circular in cross section.

2. A motorcycle attachment for use in playing games comprising a cage adapted to receive and substantially enclose the motorcycle, said cage being substantially circular in cross section, and means carried by the cage for maintaining the driver of the motorcycle in position upon the seat thereof.

3. The combination with a motorcycle, of a side car chassis secured thereto, and a cage receiving and substantially enclosing the motorcycle and said side car chassis, the cage being substantially circular in cross section.

4. The combination with a motorcycle, of a side car chassis secured thereto, a cage receiving and substantially enclosing the motorcycle and said side car chassis, the cage being substantially circular in cross section, and a seat carried by the side car chassis and straddling the supporting wheel thereof.

5. The combination with a motorcycle, of supports arranged upon opposite sides of the motorcycle, and a cage receiving and substantially enclosing the motorcycle and comprising rigid arcuate braces having their lower ends secured to said supports and their upper ends secured together.

6. The combination with a motorcycle, of supports arranged upon opposite sides of the motorcycle, and a cage receiving and substantially enclosing the motorcycle and comprising rigid arcuate braces having their lower ends secured to said supports and their uper ends secured together, one of said supports comprising a motorcycle side car chassis.

7. The combination with a motorcycle, of supports arranged upon opposite sides of the motorcycle, a cage receiving and substantially enclosing the motorcycle and comprising arcuate braces having their lower ends secured to said supports and their upper ends secured together, and a vertical brace extending upwardly from one of said supports and connected with the first named braces at the junction of the upper ends thereof.

8. The combination with a motorcycle, of supports arranged upon opposite sides of the motorcycle, a cage receiving and substantially enclosing the motorcycle and comprising arcuate braces having their lower ends secured to said supports and their upper ends secured together, and substantially horizontal braces connecting the intermediate portions of adjacent arcuate braces.

9. The combination with a motorcycle, of supports arranged upon opposite sides of the motorcycle, a cage receiving and substantially enclosing the motorcycle and comprising arcuate braces having their lower ends secured to said supports and their upper ends secured together, substantially horizontal braces connecting the intermediate portions of adjacent arcuate braces, and a vertical brace extending upwardly from one of said supports and connected with said braces at the junction of the upper ends thereof.

10. The combination with a motor cycle, of supports arranged upon opposite sides of the motorcycle, a cage receiving and substantially enclosing the motorcycle and comprising arcuate braces having their lower ends secured to said supports and their upper ends secured together, substantially horizontal braces connecting the intermediate portions of adjacent arcuate braces, a vertical brace extending upwardly from one of said supports and connected with said braces at the junction of the upper ends thereof, and retaining elements connected with said vertical brace and with certain of said horizontal braces and extending over the driver's seat of the motorcycle.

11. The combination with a motorcycle, of supports arranged upon opposite sides of the motorcycle, a cage receiving and substantially enclosing the motorcycle and comprising arcuate braces having their lower ends secured to said supports and their upper ends secured together, substantially horizontal braces connecting the intermediate portions of adjacent arcuate braces, a vertical brace extending upwardly from one of said supports and connected with said braces at the junction of the upper ends thereof, and retaining elements connected with said vertical brace and with certain of said horizontal braces and extending over the driver's seat of the motorcycle, the support from which the vertical brace extends comprising a motorcycle side car chassis.

12. The combination with a motorcycle, of supports arranged upon opposite sides of the motorcycle, a cage receiving and substantially enclosing the motorcycle and comprising arcuate braces having their lower ends secured to said supports and their upper ends secured together, substantially horizontal braces connecting the intermediate portions of adjacent arcuate braces, a vertical brace extending upwardly from one of said supports and connected with said braces at the junction of the upper ends thereof, retaining elements connected with said vertical brace and with certain of said horizontal braces and extending over the driver's seat of the motorcycle, the support from which the vertical brace extends comprising a motor cycle side car chassis, and a seat secured to said motorcycle side car chassis and straddling the supporting wheel thereof.

13. The combination with a motorcycle, of a cage receiving and substantially enclosing the motorcycle and rigidly attached to the frame thereof, said cage including a portion extending about the foot board of the motorcycle to prevent collapsing thereof upon capsizing of the motorcycle.

14. The combination with a motorcycle, of a side car chassis secured thereto, a seat carried by the side car chassis and straddling the supporting wheel thereof, and a network enclosing the upper portion of the wheel below the seat.

15. The combination with a motorcycle, of a side car chassis secured thereto, a seat carried by the side car chassis and straddling the supporting wheel thereof, a network enclosing the upper portion of the wheel below the seat, foot boards arranged at the outer side of said wheel and adapted for the reception of a foot of the person seated upon said seat, and a platform carried by said chassis and forming a support for the other foot of the rider.

16. In combination with a motorcycle embodying a frame and the usual foot board for supporting the foot of the rider, a bar substantially paralleling the ground above the level of such foot board and secured at its forward and rear ends to the frame, said bar having the portion thereof disposed adjacent the foot board arranged outwardly from the motorcycle as regards the foot board, and a brace connected at its upper end to said bar and its lower end to the motorcycle frame, extending about the foot board to maintain the same against engagement with the ground.

17. A motorcycle attachment for use in playing games, comprising a rigid cage adapted to receive and substantially enclose the motorcycle, and means carried by the cage for maintaining the driver of the motorcycle in position on the seat thereof.

18. A motorcycle attachment for use in playing games, comprising a rigid cage adapted to receive and substantially enclose the motorcycle, and a pliable member extending transversely of said cage and above the driver's seat for maintaining the driver of the motorcycle in position upon the seat.

19. The combination with a motorcycle and a sidecar chassis secured thereto, of a rigid cage receiving and substantially enclosing the motorcycle and said sidecar chassis, and means extending transversely of the cage above the driver's seat for maintaining the driver of the motorcycle in position upon the seat thereof.

20. The combination with a motorcycle of a sidecar chassis secured thereto, a seat carried by the sidecar chassis and straddling the supporting wheel thereof, foot boards arranged at the outer side of said wheel and adapted for the reception of a foot of the person seated upon said seat, and a platform carried by said chassis and forming a support for the other foot of the rider.

21. The combination with a motorcycle of a sidecar chassis secured thereto, a rigid cage receiving and substantially enclosing the motorcycle and said sidecar chassis, and a seat carried by the sidecar chassis and straddling the supporting wheel thereof, said cage embodying a part extending in front of said seat to protect the occupant thereof in event of collision.

In testimony whereof we hereunto affix our signatures.

HARRY G. EYRE.
CLEO H. CRITES.